UNITED STATES PATENT OFFICE.

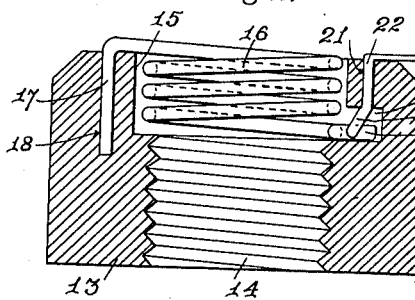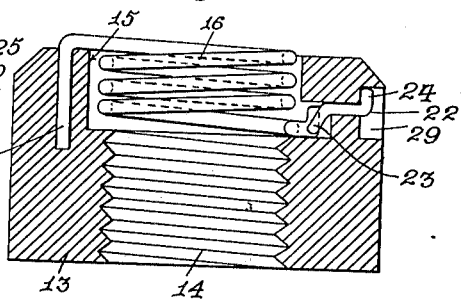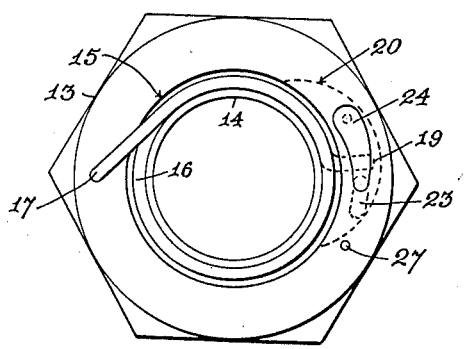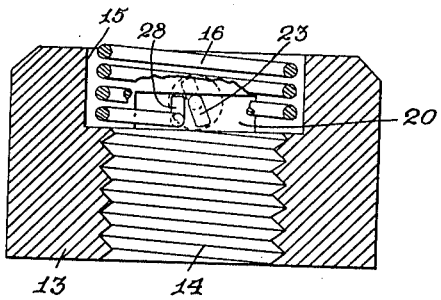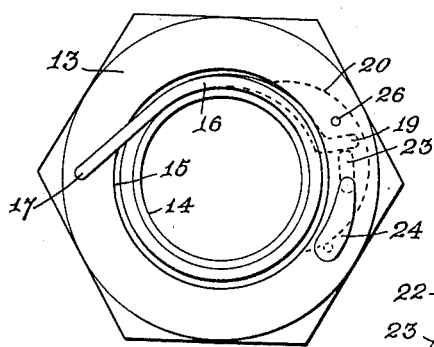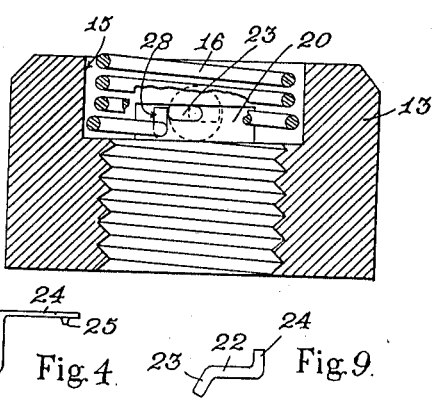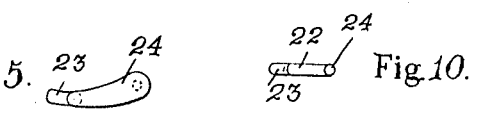

ALFRED ERNEST TERRY, OF REDDITCH, ENGLAND.

SCREW LOCKING NUT.

988,911.   Specification of Letters Patent.   Patented Apr. 4, 1911.

Application filed July 31, 1909. Serial No. 510,520.

*To all whom it may concern:*

Be it known that I, ALFRED ERNEST TERRY, a subject of the King of Great Britain, residing at Redditch, England, have invented certain new and useful Improvements in Screw Locking Nuts, of which the following is a specification.

This invention relates to improvements in or connected with the locking of screw nuts, and refers to that type of locking means in which a coil of wire is employed, and the object of this my invention is to provide improved means whereby the said coil may be controlled as to its locking or unlocked action. I attain this object by the mechanism illustrated in the accompanying drawings, upon which are figures and numbers of reference.

Figure 1 is a vertical sectional view of the invention; Fig. 2 is a plan view of the invention in which the coil is shown in its free state, in which the locking action is effected. Fig. 3 is a plan view showing the invention as seen when unlocked. Figs. 4 and 5 show in detail the controlling crank pin, in elevation and plan respectively. Figs. 6, 7 and 8 show my invention as arranged with a controlling crank pin slightly modified in shape and position. Figs. 9 and 10 show in elevation and plan respectively, detail views of the modified controlling crank pin.

In the drawing, 13 indicates a nut provided with the usual threaded opening 14 with which to engage with a screwed bolt (not shown). In the nut is also the concentric recess 15, which is somewhat larger in diameter than the opening 14. Within the recess 15 is placed a coil of wire 16, adapted to fit snugly into the screw threads of a bolt on which the nut may be fitted. The coil is preferably formed with three turns, although this number may be increased or diminished as desired. One end 17 of the coil is secured to the nut in any convenient manner, as for instance, by the said end being bent downward and passed into the hole 18 formed in the nut. The other end 19 of the coil is practically free (when operatively in use,) consequently when screwing up the nut, the tendency of the coil is to unwind, and therefore to loosen itself sufficiently on the bolt to follow the nut, so that the nut can be readily screwed home, but when the attempt is made to unscrew the nut, the latter pulls the end 17, and therefore tightens the coil upon the screw-thread of the bolt, and thus prevents any movement of the nut in that direction, since the greater the effort to so turn the nut, the greater the binding or wrapping action of the coil upon the bolt.

Now it is more particularly in relation to the control of the free end 19 of the coil that this my invention refers, and in connection therewith 20 is a recess made in the side of the concentric recess 15, and leading to the recess 20 from the exterior is a hole 21 in which is placed the pin 22 which is capable of part rotation. The lower end 23 of the pin 22 is formed crankwise, so that when turned in the one direction, (as seen in Fig. 2) the crank is clear of the coil, and thus leaves the latter free to exercise its binding or wrapping action around the bolt thread when the nut is turned in the screwing up direction. When the crank 23 is turned in the opposite direction (as seen in Fig. 3), it forces back the end 19 of the coil, and thus slightly unwinds it, and by retaining in that position, the nut may be freely turned in either direction. The outer end of the pin 22 is formed into a lever like handle 24 whereby it may be moved into the locking or unlocked position.

The handle 24 may springwise press upon the surface of the nut so as to retain it in its placed position, but preferably I provide upon its underside a teat 25, and in accordance therewith, recesses 26 and 27 are made in the nut into which the teat shall springwise snap, so as to increase the stability of the nut. If desired the upper portion of the nut may be recessed to accommodate the handle lever 24, so as to present no upward projection above the common surface of the said nut.

Upon reference to Figs. 6 to 10 inclusive it will be seen that the controlling crank pin 22 may be carried in a horizontal position, the hole for it in this case being made through and from the side of the nut. In this case it is an advantage to turn up the end 28 of the coil so as to afford a more convenient surface for the crank 23 to act upon. The outer end 24 may be made of any desirable shape so as to be operated directly by hand or by means of a key. It is further protected by being placed in the recess 29. The action of this controlling crank pin will be distinctly understood from the description of that already given.

I am aware that it has been proposed to use coils of wire in connection with screw nuts for preventing unintentional unscrewing under vibrations or other shocks, and therefore I do not claim such coils broadly.

What I claim is:—

A lock nut comprising a screwthreaded nut proper having a concentric enlargement in which is placed a coil whose one end is secured to the nut, and its other end left free, and an operative cranked pin suitably carried in the nut whose one end is adapted to act upon the aforesaid free end of said coil, and means upon the exterior of the nut to operate the said cranked pin, all substantially as set forth and shown and for the purposes specified.

In testimony whereof I have hereunto set my hand in presence of two subscribing witnesses.

ALFRED ERNEST TERRY.

Witnesses:
   J. BERNARD HAYWARD,
   N. GOODWIN.